Feb. 3, 1931.                M. B. BEHRMAN                1,791,342
                                 SEAL
                          Filed Oct. 6, 1928      2 Sheets-Sheet 1
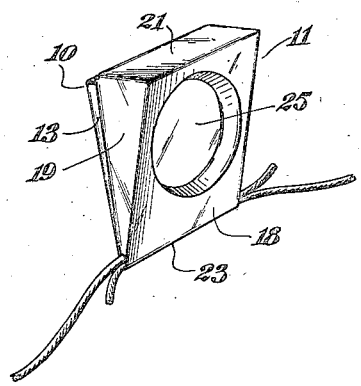
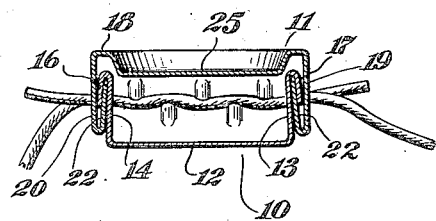
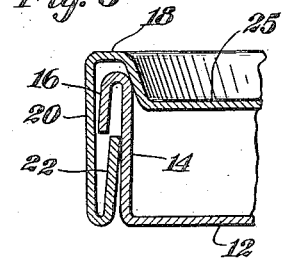
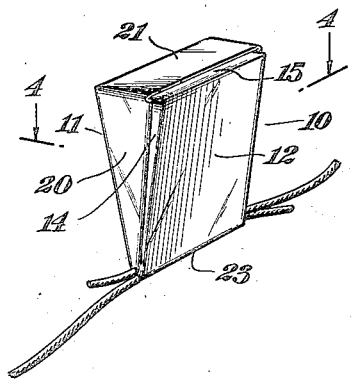
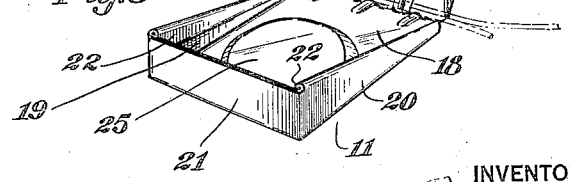

Feb. 3, 1931.   M. B. BEHRMAN   1,791,342
SEAL
Filed Oct. 6, 1928   2 Sheets-Sheet 2
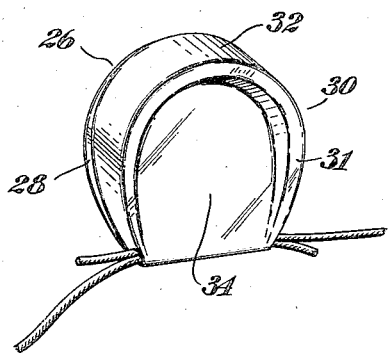
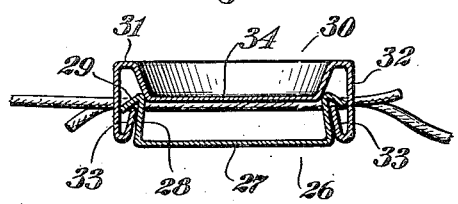
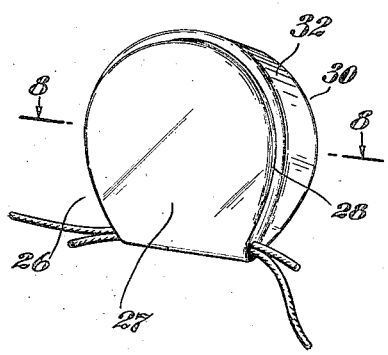
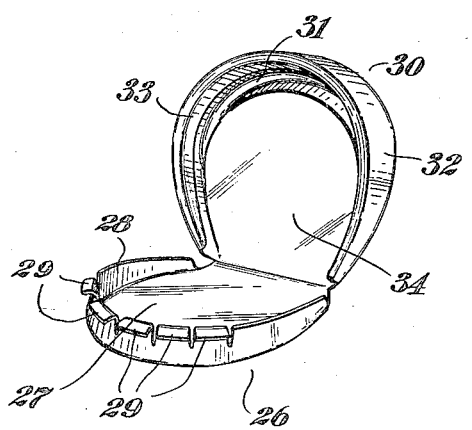
INVENTOR
Marcus B. Behrman
BY
ATTORNEY Patented Feb. 3, 1931

1,791,342

UNITED STATES PATENT OFFICE

MARCUS B. BEHRMAN, OF BROOKLYN, NEW YORK, ASSIGNOR TO SAMUEL KLEIN, OF NEW YORK, N. Y.

SEAL

Application filed October 6, 1928. Serial No. 310,721.

My present invention relates generally to sealing devices, and has particular reference to a seal designed for employment with a tie member such as that which is associated with a garment tag.

To explain the general nature of my invention, I will premise that garment tags are desirably associated with articles of merchandise in a manner which renders them irremovable except by purposeful destruction or mutilation which can be readily detected. Where a tag is provided with a tie member having one or more free ends, such tie member may be threaded through a suitable portion of the garment, such as a buttonhole, and a seal of the present character may then be associated with the tie member to form a closed loop.

My invention is of course not limited to an application of the foregoing character, the proximate purpose of the sealing device being to clamp a tie member or portions thereof in an irremovable manner, regardless of the purposes for which such clamping is desirable.

It is a general object of my invention to provide a seal whose construction is exceptionally simple, whose application to a tie member is a mere matter of pinching two portions together, which serves efficiently to clamp the tie member in the contemplated manner, and whose surreptitious removal without mutilation is rendered exceptionally difficult, if not entirely impossible.

Briefly, my seal comprises a pair of normally open hinged jaws constructed to form complementary telescopable portions of a chamber, the jaws being adapted to receive the tie member between them when open and to clamp said member within said chamber when closed. In accordance with my invention, the jaws are automatically locked together in an inseparable manner, with the tie member clamped therebetween, by merely pinching the jaws so as to cause them to approach one another. It is a particular feature of my invention to provide means within the chamber for rendering surreptitious reseparation of the jaws exceptionally difficult, if not impossible.

For the attainment of the foregoing objects and such other objects as may hereinafter appear or be pointed out, I have constructed two forms of my invention and illustrated in the accompanying drawings in which—

Figure 1 is a perspective view of a seal embodying the features of my invention and shown in closed position with two ends of a tie member irremovably associated therewith;

Figure 2 is a rear view of the device of Figure 1;

Figure 3 is a perspective view showing the seal of Figures 1 and 2 in normal open position;

Figure 4 is a cross-sectional view taken substantially along the line 4—4 of Figure 2;

Figure 5 is an enlarged view of the left-hand portion of Figure 4 with the jaws in an adjusted position, showing the impossibility of reseparation;

Figures 6, 7, 8, and 9 are views similar to Figures 1, 2, 4, and 3 respectively, illustrating a modification.

In the form illustrated in Figures 1–5, I have shown two jaws 10 and 11 formed from an integral piece of suitable sheet material, preferably brass or similar metal. The jaws are substantially similar in construction and are opposed to one another so as to form complementary portions of a chamber.

In Figure 3, it will be seen that the jaw 10 comprises a substantially rectangular body portion 12 provided with a peripheral flange extending in the direction of the jaw 11. This flange comprises the two opposite side portions 13 and 14, preferably triangular, and the end portion 15. The side portions 13 and 14 are provided with the outwardly disposed tabs or ears 16 and 17 respectively.

The jaw 11 is provided with the body portion 18 provided with a similar peripheral flange which consists of the opposite triangular side portions 19 and 20 and the end portion 21. The free edges of the portions 19 and 20 are bent inwardly to provide the inward overhangs 22 respectively.

The flange of the jaw 10 is constructed to telescope within the flange of the jaw 11, the latter thereby constituting what might be termed an outer jaw as distinguished from the inner jaw 10.

The jaws 10 and 11 are integrally formed and are joined to each other along a medial line of bending 23. Where desired, corrugations 24 may be provided along this line 23 to enhance the clamping of the tie member portions.

When the device is employed, the tie member is laid across the opened jaws and along the line 23. Thereupon, the jaws are brought together by bending along the line 23, the telescoping flanges serving to produce a closed chamber within which the tie member is clamped. The tabs 16 and 17, and the overhangs 22, are resiliently constructed so that the tabs will force their way frictionally beneath the overhangs. The mutual association of the jaws, after they have been closed, is shown most clearly in Figure 4 wherein it will be noted that the tabs 16 and 17 have automatically engaged beneath the overhangs 22 so as to render it impossible to re-separate the jaws without manipulation of the tabs 16 and 17.

It will be observed that any manipulation aiming toward a reseparation of the jaws will necessitate two steps. The first step is illustrated in Figure 5 and consists in pinching the jaws together so as to release the tabs 16 and 17 from engagement with the overhangs 22. The second step would consist in pinching the flanges 13 and 14 or the tabs 16 and 17 toward each other. In accordance with my invention I render such manipulation practically impossible by the provision of an abutment within the chamber and behind the tabs 16 and 17. In the embodiment of Figures 1–5, I provide this abutment by means of the integral indenture 25 on the body 18 of the jaw 11. This indented portion permits the jaws to be locked together, as will be readily understood, but serves to prevent manipulation of the character hereinbefore mentioned in any attempt to reseparate the jaws.

In Figures 6–9, I have provided a construction wherein the jaws are substantially circular in shape. An inner jaw 26 is provided with a body portion 27, the latter having a circumferential flange 28. The flange 28 is provided with the outwardly disposed tabs 29 arranged around a portion of the periphery.

An outer jaw 30 is provided with a body portion 31 having a peripheral flange 32. The free edge of the latter is turned inwardly to provide the overhang 33 extending substantially around the entire periphery.

When the jaws are closed, the tabs 29 will automatically force their way past the overhang 33 and snap into engagement beneath the latter as shown most clearly in Figure 8. To prevent reseparation, the body portion 31 is provided with the indenture 34 which constitutes an abutment arranged in interposition behind the tabs 29.

It will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. A seal for a tie member, comprising a pair of jaws connected together at one end, each jaw comprising a bottom portion and a marginal flange portion extending upwardly therefrom and tapering in height from adjacent the line of connection of the jaws to the outer end of each jaw to form of the jaws complementary telescopable chambered portions of gradually increasing depth, and means within said chambers for automatically securing the jaws together in an inseparable manner, said means comprising an inward overhang on the marginal flange portion of the outer jaw, an outward tab on the marginal flange portion of the inner jaw adapted to engage beneath said overhang, whereby when the jaws are brought together into telescoping position the inward overhang on the outer jaw will engage beneath the outward tab on the inner jaw to secure the two members against separation, and a depression in the outer jaw presenting a portion closely adjacent said tab so as to prevent manipulation of the latter, whereby when a tie member is positioned between the jaws at their line of connection, and the jaws brought into fully telescoped position, the tie member will be clamped between the jaws and the jaws held against separation.

2. A seal for a tie member comprising an integral blank of bendable sheet material adapted to be doubled upon itself along a medial line to form two substantially rectangular hinged jaw portions, each of said jaw portions having a marginal flange tapering gradually toward said hinge line and terminating substantially at said hinge line, said flanges being adapted to telescope one within the other to close the seal and provide a wedge-shaped chamber of said jaw portions, the outer flange having an inward overhang, and the inner flange having an outward tab adapted to engage beneath said overhang when said flanges are telescoped, whereby a tie member laid along said hinge line when the seal is open may be clamped within said chamber when the seal is closed; the jaw carrying the outer flange having an integral inward depression formed therein and adapted to lie within the confines of said inner flange when the seal is closed.

3. A seal for a tie member comprising an integral blank of bendable sheet material adapted to be doubled upon itself along a medial line to form two hinged jaw portions, each of said jaw portions being substantially circular and having a circumferential flange tapering gradually toward said hinge line and terminating substantially at said hinge line, said flanges being adapted to telescope one within the other to close the seal and provide a wedge-shaped chamber of said jaw portions, the outer flange having an inward overhang, and the inner flange having a plurality of outward tabs adapted to engage beneath said overhang when said flanges are telescoped, whereby a tie member laid along said hinge line when the seal is open may be clamped within said chamber when the seal is closed.

In witness whereof I have signed this specification this 5 day of October, 1928.

MARCUS B. BEHRMAN.